United States Patent [19]

Kitajima

[11] Patent Number: 5,629,756
[45] Date of Patent: May 13, 1997

[54] LASER BEAM PROJECTION APPARATUS

[75] Inventor: Eiichi Kitajima, Yokohama, Japan

[73] Assignee: Nikon Corporation, Tokyo, Japan

[21] Appl. No.: 381,417

[22] Filed: Jan. 31, 1995

[30] Foreign Application Priority Data

Feb. 3, 1994 [JP] Japan .................. 6-031900

[51] Int. Cl.$^6$ .................. G01C 3/08; G01C 5/00
[52] U.S. Cl. .................. 356/3.09; 356/4.03; 356/4.08
[58] Field of Search .................. 356/3.09, 4.08, 356/4.03

[56] References Cited

U.S. PATENT DOCUMENTS

| | | |
|---|---|---|
| 4,221,483 | 9/1980 | Rando .................. 356/250 |
| 4,830,489 | 5/1989 | Cain et al. .................. 356/73 |
| 5,110,202 | 5/1992 | Dornbusch et al. . | 
| 5,204,731 | 4/1993 | Tanaka et al. . |
| 5,258,822 | 11/1993 | Nakamura et al. . |
| 5,367,458 | 11/1994 | Roberts et al. .................. 364/424.02 |
| 5,387,969 | 2/1995 | Marantette . |
| 5,515,156 | 5/1996 | Yoshida et al. .................. 356/3.09 |

*Primary Examiner*—Stephen C. Buczinski
*Attorney, Agent, or Firm*—Shapiro and Shapiro

[57] ABSTRACT

A laser beam projection apparatus is capable of supplying laser beams finely converged on an object at all times irrespective of a distance to the object. The laser beam projection apparatus has a laser beam generator, including a focus adjusting device, for supplying laser beams periodically swept within one plane and, at the same time, converged at a controllable distance, a light receiving element for receiving reflected laser beams from a predetermined object and generating an output signal, a distance calculating unit for calculating a distance to the object on the basis of the output signal and a controller for operating the focus adjusting device so that the swept laser beams are converged in a position corresponding to the calculated distance. The controller can change a sweep speed of the laser beam in accordance with a change in the calculated distance. The controller cna change a sweep speed of the laser beam in accordance with a change in the calculated distance.

7 Claims, 4 Drawing Sheets

LASER BEAM PROJECTION APPARATUS

BACKGROUND OF THE INVENTION

1. Field of the Invention

The present invention relates generally to a laser beam projection apparatus employed in the sector of construction and civil engineering and, more particularly, to a laser beam projection apparatus used for level surveying using a laser beam and a work of marking along a horizontal or perpendicular surface.

2. Related Background Art

There is known a laser beam projection instrument as disclosed in, e.g., U.S. Pat. No. 4,221,483. This laser beam projection instrument includes an optical system having a collimator lens which substantially collimates the laser beams emitted from a light source such as an He—Ne gas laser or a laser diode. The thus collimated laser beams are then emitted in the horizontal direction via a rotary mirror. Thus, the laser beam projection instrument supplies the laser beams swept on the horizontal plane.

This type of conventional laser beam projection instrument is placed substantially at the center of a room, and the swept laser beams are emitted, thereby making it possible to perform leveling on an inner wall surface. That is, if the laser beams are visible, a line of the laser beam appears on the peripheral wall surface, and, therefore, the worker puts a mark on the center of the line width. Whereas if invisible, a dedicated sensor is mounted on the wall surface, and the marking may be effected. Such a marking operation is executed at a predetermined interval along the line of laser beams, and thereafter the respective marks are connected by a line, thus completing the leveling operation.

Further, as disclosed in U.S. Pat. No. 4,830,489, there is also known an alignment apparatus using the laser beam projection instrument in combination with one or a plurality of sensors.

If a distance from the laser beam projection instrument to the wall surface or the sensor is long, however, a width of the laser beams emitted from the conventional laser beam projection instrument is gradually expanded. Consequently, there arises a problem in which the line of the laser beams becomes thick enough to induce a deterioration in terms of a marking accuracy. Further, in the case of the visible laser beams, there is caused such a problem that a luminance on the wall surface decreases with the expansion of the beam width or an increase in a beam shifting speed on the wall surface, resulting in a worsened visual recognizability.

Hitherto, there has been also proposed a laser beam projection instrument incorporating a function of manually control the optical system so that the laser beams are converged on an object such as a wall surface or the like. There exists, however, a problem in which two workers are needed for controlling the optical system and for confirming the width of the laser beams on the wall surface, and, besides, the work is conducted while the two workers communicated with each other, resulting in a worsened workability.

SUMMARY OF THE INVENTION

It is a primary object of the present invention to provide a laser beam projection apparatus capable of supplying laser beams controlled in the best state at all times irrespective of a distance to an object.

It is another object of the present invention to provide a laser beam projection apparatus which enables only one worker to perform a marking operation.

According to one aspect of the present invention, there is provided a laser beam projection apparatus comprising: a laser beam generator, including a focus adjusting device, for supplying laser beams periodically swept within one plane and, at the same time, converged at a controllable distance; a light receiving element for receiving reflected laser beams from a predetermined object and generating an output signal; a distance calculating unit for calculating a distance to the object on the basis of the output signal; and a controller for operating the focus adjusting device so that the swept laser beams are converged in a position corresponding to the calculated distance.

According to the laser beam projection apparatus of the present invention, the laser beams are always finely converged on an object, and, hence, a clear-cut line is projected on the object.

A reflecting member is disposed on the object so as to reflect the laser beams from the laser beam generator, and the reflecting member is formed with at least one pair of reflecting patterns spaced at a predetermined interval. Since the light receiving element periodically generates a couple of output signals corresponding to the pair of reflecting patterns, the distance calculating unit is capable of calculating a distance R on the basis a sweep period of the laser beam and the interval between the couple of output signals.

If the laser beam generator is further provided with a speed controller for controlling the sweep speed of the laser beam by regulating the driving device, it is possible to perform the control of reducing the sweep speed of the laser beam in accordance with an increase in the calculated distance R. For example, if the calculated distance R exceeds a fiducial distance, the sweep speed is reduced. Whereas if the distance R is the fiducial distance or under, the control is effected to increase the sweep speed. A visual recognizability of the line on the object is thereby enhanced.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 1:
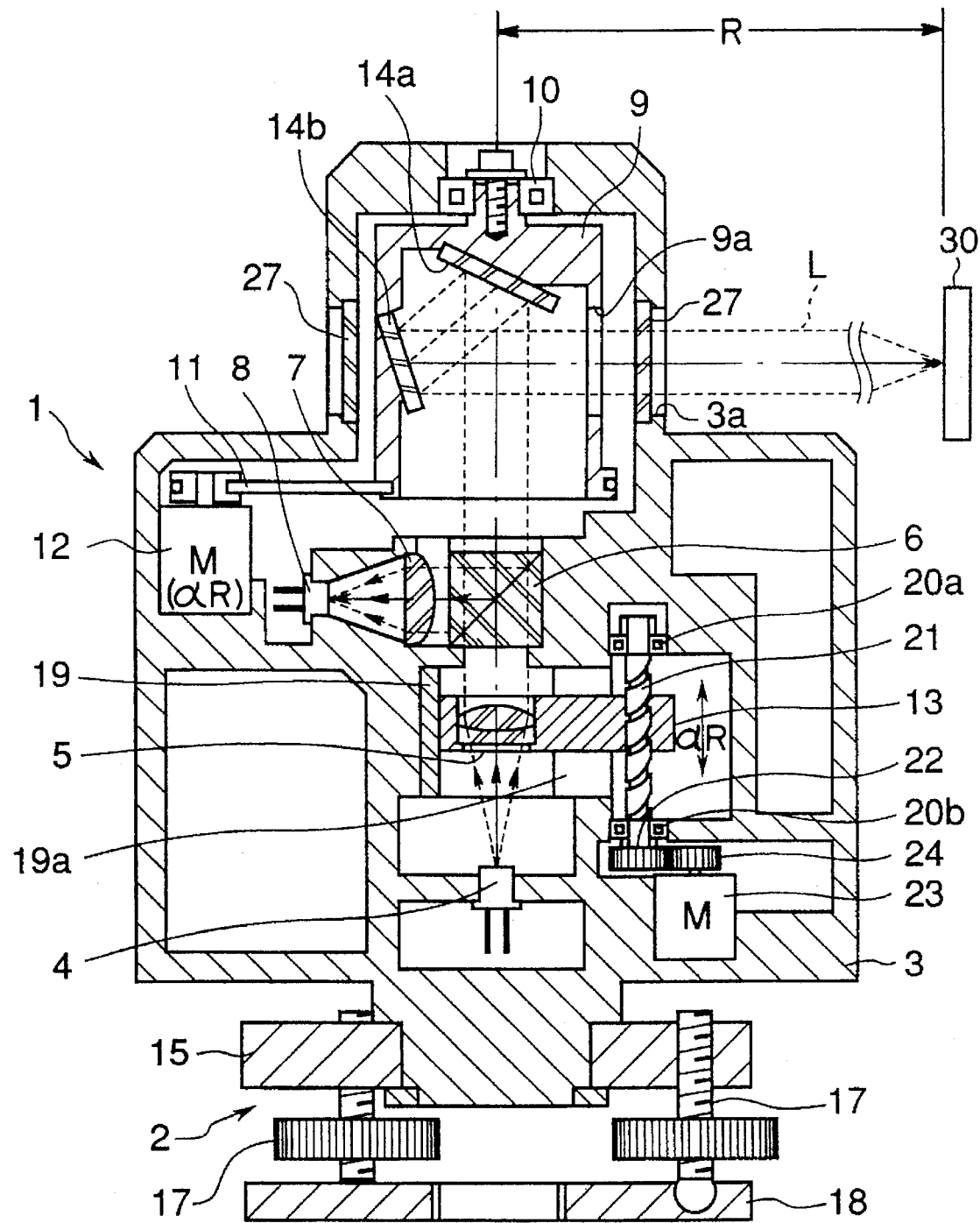
FIG. 1 is a vertical cross sectional view illustrating a laser beam projection apparatus in an embodiment of the present invention.

Embodiments of a laser beam projection apparatus of the present invention will be discussed. A laser beam projection apparatus illustrated in FIG. 1 includes a light projection unit 1 and a leveling unit 2.

A housing 3 of the light projection unit 1 houses a laser diode for emitting a visible laser beam L. A projection lens 5 for converging the visible laser beams L is so disposed upwardly of the laser diode 4 as to be held by a support member 13. A beam splitter 6 is provided upwardly of the projection lens 5. A condenser lens 7 is disposed in the left direction of the beam splitter 6. A light receiving element 8 is fixed in a focal position of the condenser lens 7.

A rotary cylindrical body 9 is placed above the beam splitter 6. The rotary cylindrical body 9 is so supported by the housing 3 as to be rotatable about a perpendicular axis through a bearing 10. A motor 12 for rotating the rotary cylindrical body 9 through a transmission belt 11 is provided in the left direction of the light receiving element 8. A pair of reflex mirrors 14a, 14b for guiding the laser beams L penetrating the projection lens 5 and the beam splitter 6 in the horizontal direction are fixed within the rotary cylindrical body 9.

The rotary cylindrical body 9 is formed with an aperture portion 9a which admits the laser beams L traveling in the horizontal direction from the reflex mirror 14b. On the other hand, a multiplicity of aperture portions 3a through which the laser beams L from the aperture portion 9a are emitted to the outside are formed along a substantially entire periphery of the housing 3. Transparent protection glasses 27 are fixed to these aperture portions 3a. The rotary cylindrical body 9 is rotated by the motor 12, and the laser beam L penetrating the protection glass 27 and is emitted to the outside is swept through 360° within the horizontal plane.

Further, the support member 13 is fitted to a cylindrical linear guide 19 so that the projection lens 5 is precisely shiftable along the optical axis of the laser beam L leading to the reflex mirror 14a from the laser diode 4. The linear guide 19 has a guide notch 19a formed in the axial direction. The support member 13 fitted to the linear guide 19 is precisely guided along the optical axis of the laser beam L through the notch 19a. The support member 13 is also fitted to a ball screw 21 so supported by the housing 3 as to be rotatably through bearings 20a, 20b. A gear 22 is fixed to one end of the ball screw 21 and meshes with a gear 24 of a pulse motor 23.

The leveling unit 2 is constructed of an upper plate 15 fixed to the housing 3 of the light projection unit 1 and a lower plate 18 attached via three pieces of leveling screws 17 to this upper plate 15.

Figure 2:
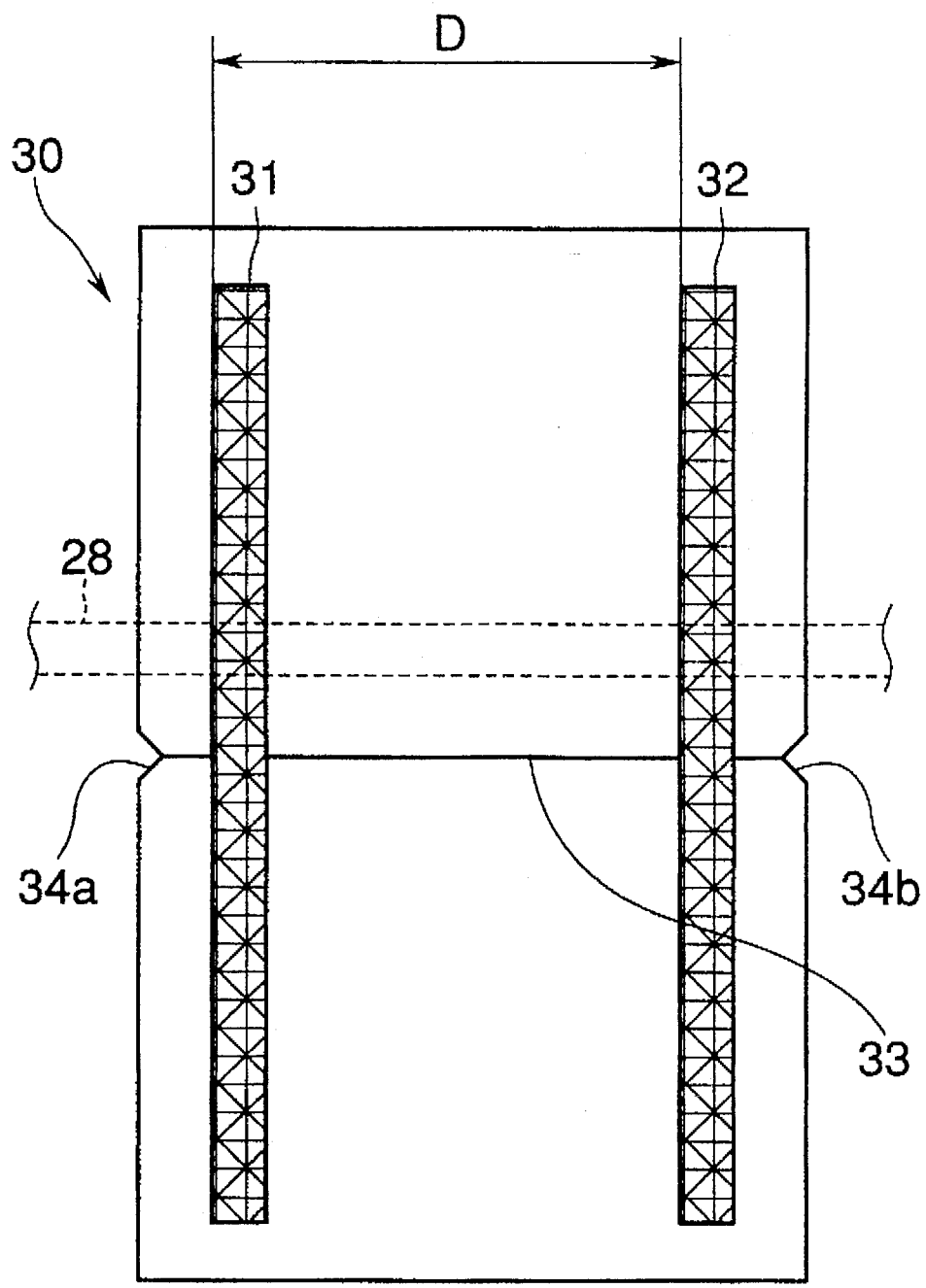
FIG. 2 is a plan view showing a light reflecting plate in the embodiment of the present invention.

A resinous light reflecting plate 30 for reflecting the laser beam L emitted from the light projection unit 1 is disposed above an object for marking. As illustrated in FIG. 2, reflecting patterns 31, 32 spaced at a predetermined interval D but parallel to each other are formed on the light reflecting plate 30. Each of the reflecting patterns 31, 32 has a strong directivity to reflect the laser beam L in an incident direction and is constructed of, e.g., a reflecting sheet the surface of which is formed with a multiplicity of hyperfine corner cubes. The light reflecting plate 30 includes a line 33 extending orthogonally to the reflecting patters 31, 32. marking notches 34a, 34b are formed in positions at both ends of the line 33.

Figure 3:
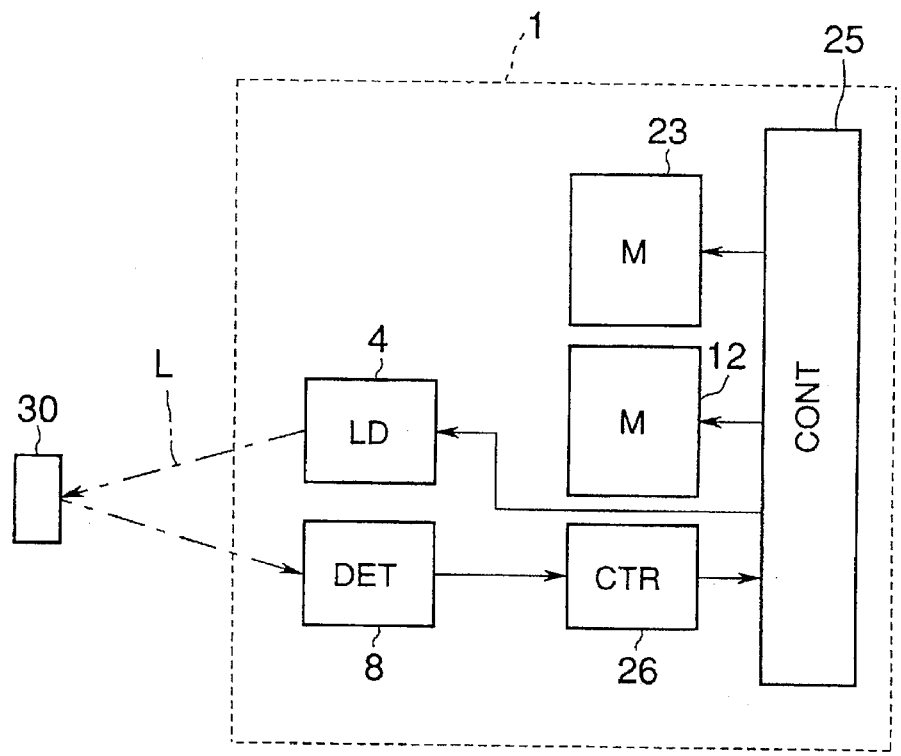
FIG. 3 is a block diagram illustrating an embodiment of a control device.
Figure 4:
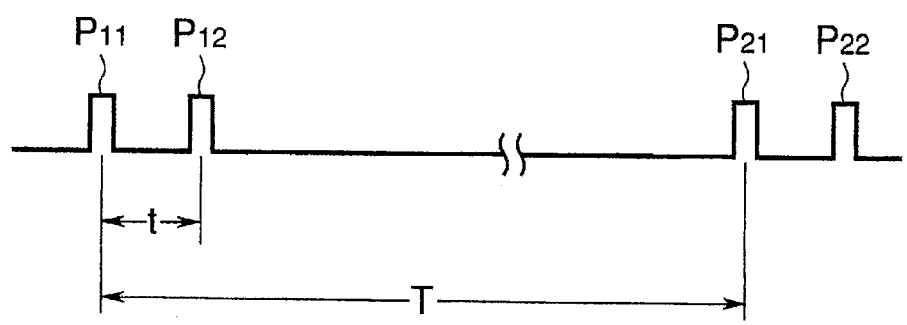
FIG. 4 is a diagram showing a waveform of an output signal of a light receiving element.

The light projection unit 1 is equipped with a control device shown in FIG. 3. The laser diode 4 emits the visible laser beam L on the basis of a drive signal given from a controller 25 including an arithmetic unit. An output of the light receiving element 8 enters a time counter 26, while an output of the time counter 26 enters the controller 25. The light receiving element 8 receives and photoelectrically converting the laser beams reflected by the light reflecting plate 30, thereby generating consecutive pulse couplings (P11), P12), (P21, P22), . . . as illustrated in FIG. 4. The time counter 26 counts a time interval t between the pulses P11 and P12 and a time interval T between the pulse coupling (P11, P12) and the pulse coupling (P21, P22). The controller 25 calculates a distance from the light projection unit 1 to the light reflecting plate 30 on the basis of an item of time data counted by the time counter 26. The controller 25 then outputs a drive pulse to a pulse motor 23 and, at the same time, controls a rotating speed of the motor 12.

The pulse motor 23 rotates in response to the drive pulse from the controller 25, thus moving the support member 13 for holding the projection lens 5. As a result, a converging position of the laser beams L is adjusted. The rotating speed of the motor 12 is controlled by the controller 25, thereby determining a sweep speed of the laser beam L.

Figure 5:
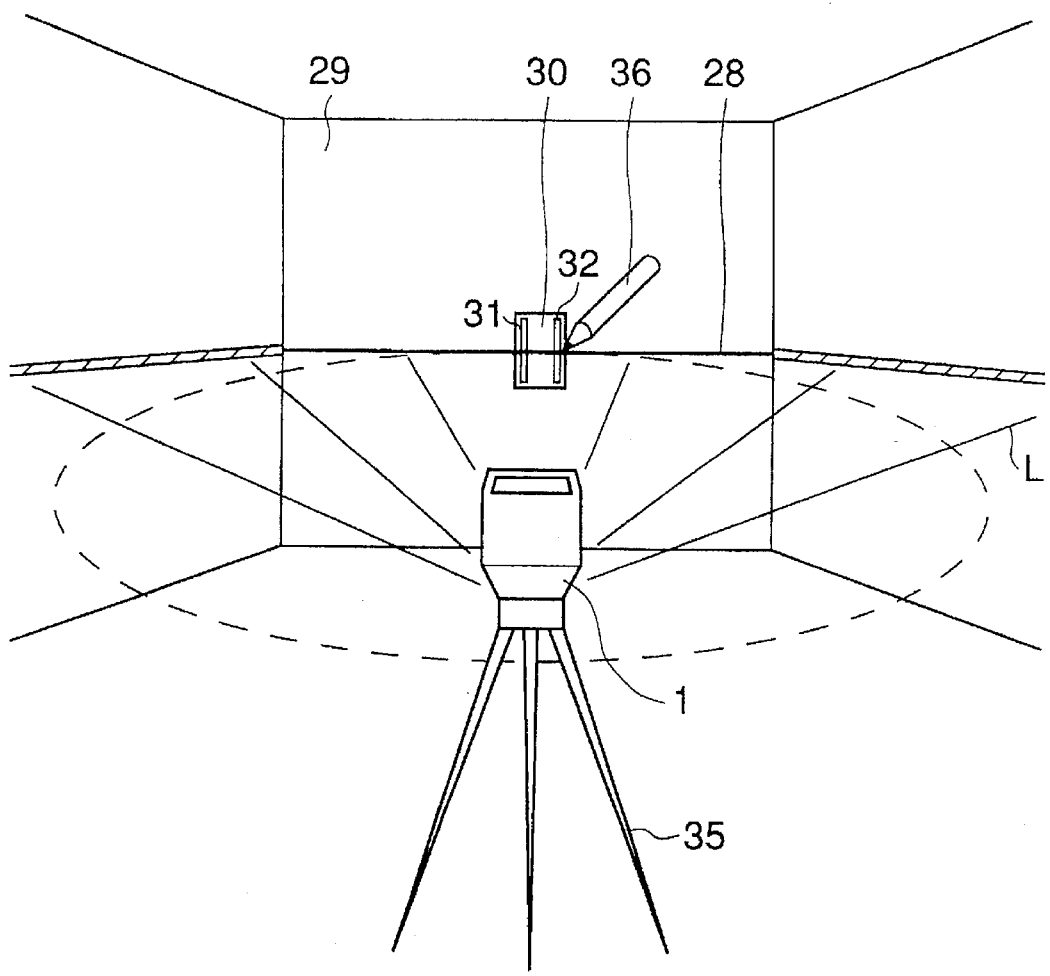
FIG. 5 is an explanatory view illustrating a using state in a marking operation by use of the laser beam projection apparatus in the embodiment of the present invention.
Figure 6:
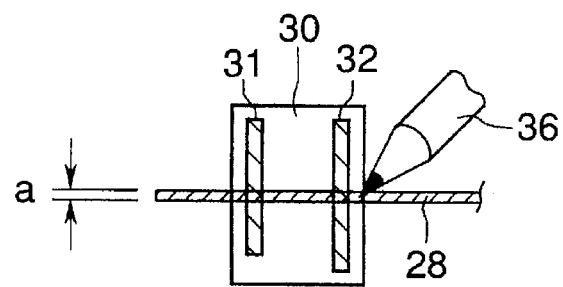
FIG. 6 is a partially enlarged view of FIG. 5.

There is given an explanation of the operation when performing the marking along the horizontal plane on a wall surface within a room by use of the laser beam projection apparatus in this embodiment with reference to FIGS. 5 and 6.

The light projection unit 1 mounted on a tripod is placed substantially at the center of the room. After the leveling has been performed by operating the leveling unit 2, the light projection unit 1 is started. With the start-up of the light projection unit 1, the controller 25 outputs a lightening signal. Hereupon, the laser diode 4 emits the laser beams L. The laser beams L are converged by the projection lens 5 and are reflected by the pair of reflex mirrors 14a, 14b in the horizontal direction.

When starting the motor 12, the rotary cylindrical body 9 is rotated clockwise, and, therefore, the laser beams L penetrating the protection glasses 27 and emerging therefrom toward the outside are swept through 360° within the horizontal plane. These laser beams L are so initialized as to be converged at a distance of 30 m from the light projection unit.

A line 28 of the laser beam having a width a, upon sweeping the laser beam L, appears on a wall surface 29, and, hence, the worker perpendicularly places and holds the light reflecting plate 30 on the line 28 so that the reflecting patterns 31, 32 are substantially orthogonal to the line 28. On the occasion of this placing operation, if a line 33 orthogonal to the reflecting patterns 31, 32 is overlapped with the line 28 of the laser beam, the light reflecting plate 30 can be correctly perpendicularly placed.

When the light reflecting plate 30 is disposed on the wall surface 29, the reflecting patterns 31, 32 are periodically repeatedly swept by the laser beams L. When irradiating the reflecting pattern 31 with the laser beams L, the laser beams reflected therefrom travel back to the light projection unit 1 and are converged on the light receiving element 8, with the result that pulses P11 are outputted from the light receiving element 8. Upon receiving these pulses P11, the time counter 26 starts counting these pulses.

The laser beams L are rotated, and, when the reflecting pattern 32 is irradiated with the laser beams L, the light receiving element 8 outputs pulses P12 after photoelectrically converting the reflected laser beams. The time counter 26 counts the time t from a point of time when receiving the previous pulse P11 to a point of time when receiving the pulse P12 and outputs an item of time data thereof to the controller 25.

Next, when the laser beam L makes one rotation and again falls on the reflecting pattern 31, the light receiving element 8 outputs a pulse P21. The time counter 26 counts a time T from a point of time when receiving the former pulse P11 to a point of time when receiving the latter pulse P21 and outputs an item of time data thereof to the controller 25.

Thus, the controller 25 obtains the time for which the laser beam L travels across between the reflecting patterns 31 and 32 and the time T for which the laser beam L makes one rotation. Then, the following proportional formula is established:

$$D/2\pi R = t/T$$

where D is the interval D between the reflecting patterns 31 and 32, and R is the distance from the center of the light projection unit 1 to the light reflecting plate 30. Hence, the controller 25 performs a calculation such as: Distance R=DT/2πt. Then, the following relationship is also established:

$$1/F = 1/f1 + 1/R$$

where F is the focal length of the projection lens 5, f1 is the distance from the light source 4 to the projection lens 5, and R is the distance from the projection lens 5 to an image of the light source. Therefore, the controller 25 obtains a position of the light source 4 in accordance with the following formula:

$$f1 = F \cdot R/(R-F)$$

Then, the controller 25 calculates a direction and a quantity with which the projection lens 5 should be shifted from the initialized position.

The controller 25 outputs, to the motor 23, the pulses the number of which corresponds to the thus calculated shift quantity, thereby rotating the pulse motor 23. With rotations of the pulse motor 23, a ball screw 7 is rotated through gears 24, 22, and the projection lens 5 is thus shifted together with the support member 13. The converging position of the laser beams L coincides with the calculated distance R, i.e., on the wall surface 29.

Further, the controller 25 determines a dimension of the calculated distance R and changes the rotating speed of the motor 12 in accordance with the distance, thus adjusting a sweep speed of the laser beam. If an angular speed of the rotating laser beam is fixed, the sweep speed of the laser beam increases with the larger distance R, with the result that a visual recognizability of the laser beam projected on the wall surface declines. For this reason, when the distance R is large, the decline in terms of the visual recognizability is prevented by reducing the angular speed of the rotating laser beam. For example, if the distance exceeds the initialized value of 30 m, the rotating speed of the motor 12 is decreased. Contrastingly, if equal to 30 m or under, the rotating speed is increased, thus controlling the rotating speed.

As a modified example of the light reflecting plate 30 in this embodiment, one reflecting pattern having a width D may be used in place of the two reflecting patterns 31, 32 spaced at the interval D but parallel to each other. In this case, the time counter 26 detects a time for which the laser beam L travels across from one edge of the reflecting pattern to the other edge thereof.

A light wave distance measuring technology which has hitherto been known in the field of surveying may be employed for obtaining the distance R to the wall surface. For instance, the pulse beam is emitted toward the wall surface, and a distance can be also obtained by measuring a time for which the pulse beam returns. Alternatively, there may be used a distance detecting technology known in the field of cameras.

For changing the converging position of the laser beams, there may be taken such a construction that the projection lens is fixed, and the light source is moved with respect to the projection lens.

The line 28 of the laser beam thus finely clearly appears on the wall surface, and, therefore, the worker is capable of making the line 28 precisely coincident with the line 33 of the light reflecting plate 30 and putting a mark on the wall surface 29 by making use of the marking notches 34a, 34b formed at both ends of the line 33.

It is apparent that, in this invention, a wide range of different working modes can be formed based on the invention without deviating from the spirit and scope of the invention. This invention is not restricted by its specific working modes except being limited by the appended claims.

What is claimed is:

1. A laser beam projection apparatus comprising:

a laser beam generator, including a focus adjusting device, for supplying laser beams periodically swept within one plane and, at the same time, converged at a controllable distance;

a light receiving element for receiving reflected laser beams from a predetermined object and generating an output signal;

a distance calculating unit for calculating a distance to the object on the basis of the output signal; and a controller for operating said focus adjusting device so that the swept laser beams are converged in a position corresponding to the calculated distance.

2. A laser beam projection apparatus according to claim 1, further comprising:

a reflecting member disposed on the object so as to reflect the laser beams from said beam generator, wherein said light receiving element receives the laser beams reflected from said reflecting member.

3. A laser beam projection apparatus according to claim 2, wherein said reflecting member has at least a pair of reflecting patterns spaced at a predetermined distance, said light receiving element periodically generates a couple of output signals corresponding to the pair of reflecting patterns, and said distance calculating unit calculates the distance on the basis of a sweeping period of laser beam and an interval between the couple of output signals.

4. A laser beam projection apparatus according to claim 3, wherein said beam generator includes a driving device for sweeping the laser beam within the plane with a predetermined sweep speed, said distance calculating unit includes a counter for counting a time interval between one of the couple of output signals and the other signal and also a generating period of the couple of output signals, and the distance to the object is calculated based on a counted value by said counter and a predetermined interval between the pair of reflecting patterns.

5. A laser beam projection apparatus according to claim 4, wherein said laser beam generator further includes a speed controller for controlling the sweep speed of the laser beam by regulating said driving device, and said speed controller changes the sweep speed of the laser beam, corresponding to a change in the calculated distance.

6. A laser beam projection apparatus comprising:

a laser beam generator, including a speed controller, for supplying laser beams swept at a controllable speed;

a light receiving element for receiving reflected laser beams from a predetermined object and generating an output signal; and a distance calculating unit for calculating a distance to the object on the basis of the output signal, wherein said speed controller changes a sweep speed of the laser beam, corresponding to a change in the calculated distance.

7. A laser beam projection apparatus according to claim 6, wherein said speed controller reduces the sweep speed of the laser beam when the calculated distance exceeds a predetermined distance.

* * * * *